United States Patent [19]
Callcott et al.

[11] 4,042,344
[45] Aug. 16, 1977

[54] PROCESS FOR THE PRODUCTION OF GASEOUS MIXTURES

[75] Inventors: Thomas George Callcott, Mayfield; Terrence Kevin Deague, Kotara, both of Australia

[73] Assignee: The Broken Hill proprietary Company Limited, Victoria, Australia

[21] Appl. No.: 684,003

[22] Filed: May 7, 1976

[30] Foreign Application Priority Data

May 9, 1975 Australia .............................. 1532/75

[51] Int. Cl.² .............................................. C10J 1/12
[52] U.S. Cl. ..................... 48/197 R; 48/202; 48/215; 252/373; 239/406; 431/173
[58] Field of Search ............ 48/61, 117, 99, 104, 48/107, 109, 93, 113, 180 A, 180 C, 180 M, 197 R, 202, 206, 212, 215; 252/373; 23/259.5, 277 R; 431/353, 348, 284, 285, 173; 239/399, 403, 405, 406

[56] References Cited

U.S. PATENT DOCUMENTS

| 2,398,654 | 4/1946 | Lubbock et al. ...................... 48/107 |
| 2,898,204 | 8/1959 | Totzek .................................... 48/203 |
| 2,904,417 | 9/1959 | Nuyl ........................................ 48/107 |
| 2,905,544 | 9/1959 | Totzek .................................... 48/206 |
| 3,048,476 | 8/1962 | Dwyer ..................................... 48/215 |
| 3,669,628 | 6/1972 | Latham et al. ...................... 23/259.5 |
| 3,713,588 | 1/1973 | Sharpe ................................... 239/406 |
| 3,955,941 | 5/1976 | Houseman et al. ..................... 48/215 |

Primary Examiner—Robert L. Lindsay, Jr.
Assistant Examiner—George C. Yeung
Attorney, Agent, or Firm—Murray and Whisenhunt

[57] ABSTRACT

A process for the production of a gaseous mixture containing substantial amounts of carbon monoxide and hydrogen, which comprises: (1) blending an oxidizing gas and a primary fuel within a combustion chamber having a combustion zone, which is substantially free of baffles, to produce a compressible gas or gas-like mixture; (2) causing the mixture to assume a highly turbulent compact and self-contained configuration by subjecting it to swirl, the swirling mixture having a swirl number greater than 0.5 and no greater than 1.5, and igniting the mixture when in this configuration to achieve total combustion of the primary fuel to produce hot gaseous products; and (3) thereafter mixing and reacting the hot gaseous products with a gas-like secondary fuel in the combustion chamber, wherein the secondary fuel is introduced into the combustion chamber adjacent to the wall thereof and in physical contact with the self-contained configuration, to produce a gaseous mixture containing substantial amounts of carbon monoxide and hydrogen.

9 Claims, 13 Drawing Figures

PROCESS FOR THE PRODUCTION OF GASEOUS MIXTURES

The present invention relates to a novel gasification apparatus and process for the production of a gaseous mixture containing substantial amounts of carbon monoxide and hydrogen. This gaseous mixture would be suitable for use as a reducing agent in, say, a metallurgical context, or as the raw material in a synthesis process.

The production of gases from solids and liquids containing carbonaceous materials forms an integral part of a wide variety of industrial processes. Typically, these product gases are used to reduce ores or, after purification, to participate in synthesis reactions for the production of hydrocarbons, methanol, ammonia, or other substances. Such reducing or synthesis gases must contain substantial amounts of carbon monoxide and hydrogen, i.e. their carbon and hydrogen content must be incompletely oxidised.

Partial combustion processes produce gases of this type by burning the input liquid or solid material under conditions of oxygen deficiency. The problems associated with partial combustion processes are discussed in 'Gas Making and Natural Gas', BP Trading Ltd., 1972. They arise because in partial combustion processes, temperatures are low compared with those in total combustion processes. The result is that chemical reactions proceed comparatively slowly, and chemical equilibrium is relatively difficult to achieve. This has three undesirable consequences:

1. Bulky reaction chambers are required in order that large enough residence times can be achieved.
2. Substantial quantities of soot, char, or unburnt fuel tend to be produced. This is a source of material loss, and of deposits on the inside of the reactor. Furthermore, the presence of quantities of particulate or aerosol matter in the product gas could result in subsequent gas handling and processing problems.
3. The very high degree of oxygen deficiency required to produce the best yields of carbon monoxide and hydrogen, cannot be achieved without enormous aggravation of the above-mentioned undesirable consequences.

Problems of this type were experienced in the design and operation of a combustion system for supplying heat to the shaft furnace of a continuous coking pivot plant. The process requirement in this case was for large flows of high temperature gas containing little or no $CO_2$, $H_2O$, and soot. The requirement could not be met using total combustion systems. Conventional partial combustion systems were too bulky and uneconomic, and hence it was necessary to develop a novel system. The process of the present invention arose out of this development work, and provides the required solution to this specific shaft furnace problem.

An alternative to current partial combustion practice for the production of reducing or synthesis gas involves substantially total combustion of a primary fuel, the $CO_2$ and $H_2O$ produced thereby being made to react with a secondary fuel to produce amounts of carbon monoxide and hydrogen. By choosing this alternative route, advantage may be taken of the higher temperatures characteristic of total combustion to ensure virtual completeness of chemical reaction, even with non-gaseous fuels. Hence the undesirable consequences of partial combustion, mentioned above, are largely avoided. Such a route is envisaged in U.S. Pat. No. 2,621,117, Garrison, and forms the basis of that patent.

By adopting procedures which are novel in the context of gasification technology, the process of the present invention is better able to take advantage of the desirable characteristics of total combustion than is the process disclosed in the Garrison patent. The equipment required for the process of the present invention is simpler and more compact than is the apparatus specified in the Garrison patent, and will produce a distinct total combustion zone without the aid of baffles as in the Garrison apparatus. Furthermore, because baffles are unnecessary in the equipment required for the process of the present invention, better mixing of the products of total combustion with the secondary fuel can be achieved in this equipment than will occur in the Garrison apparatus.

Three reactant materials are consumed in the process of the present invention: (i) an oxidising gas which will generally be oxygen, air, or oxygen-enriched air, and which may contain additives such as steam; (ii) a primary fuel, which may be solid, liquid, gaseous, or a mixture of these, and (iii) a secondary fuel, which would preferably be gaseous. The oxidising ingredient in the oxidising gas will generally be oxygen, but situations are envisaged (e.g. chlorination processes) where it could be any gas capable of participating in an exothermic reaction with an appropriate primary reagent. Even though a closer approach to chemical equilibrium would be expected using gaseous secondary fuels, situations are envisaged in which the secondary fuel could be non-gaseous, e.g. the by-products from coking plants, or the products and/or residues from coal liquefaction plants.

Substances which undergo little or no net chemical change in the process of the present invention (or in selected parts of it) may be admitted to the process as ingredients in any of the three reactant materials mentioned above. It is envisaged that such "inert" substances could have important roles to play in the process. Inerts may be admitted to the process of the present invention:

a. for the purpose of process control. For example $CO_2$ and $H_2O$, which are substantially inert in the total combustion zone of the process, may be used to control the temperature of this zone and the ratio of CO to $H_2$ in the product gas from the process. Alternatively nitrogen, which is substantially inert in the process as a whole, can be used to control the process temperature or the partial pressures of the other gaseous components in the product gas.

b. so that they can participate chemically in subsequent processes. For example, a nitrogen input to the process may facilitate a subsequent ammonia synthesis process.

c. for their catalytic effect on the process, or on subsequent processes.

d. as harmless contaminants in one or more of the reactant materials which it has been inconvenient or unnecessary to clean up prior to its input to the process. For example, fuel mineral matter which does not interfere with the process could be allowed to pass straight through it. Gas cleaning (if necessary) could then take place at some convenient stage subsequent to the process.

The three reactant materials mentioned above are fed continuously into a cylindrically symmetric reaction vessel. The process of the present invention occurs in the reaction vessel according to the following sequence of events.

Firstly, the oxidising gas and the primary fuel are blended together in such a way as to produce a gas-like mixture, with the essential property of compressibility. This gas-like mixture may actually be a gas, but, especially in the case of non-gaseous primary fuel, it is more likely to be a suspension of solid particles and/or liquid droplets in a gaseous medium. Secondly, at the point of, or downstream from this blending operation, the gas-like mixture is caused to assume a highly turbulent compact and self-contained configuration such as by subjecting it to a swirl, i.e. angular momentum about the axis of the vessel. In this configuration, the gas-like mixture is ignited and as a result, a hot, stable, compact, and self-contained total combustion zone develops. Where the primary fuel is a liquid or solid, complete gasification of the mineral free portion of the primary fuel occurs in such a total combustion zone. Thirdly, and downsteam from the total combustion zone, mixing of the hot gaseous products from this zone with the secondary fuel occurs, and as a result of their chemical interaction, a gaseous mixture containing substantial amounts of carbon monoxide and hydrogen is formed. The secondary fuel is preferably introduced to the reaction vessel so that it forms a sheath around the total combustion zone, this sheath being in direct physical contact with the total combustion zone.

The process of the invention may therefore be summarised as comprising the steps of (1) blending an oxidising gas and a primary fuel within a combustion chamber to produce a compressible gas or gas-like mixture, (2) causing said mixture to assume a highly turbulent compact and self-contained configuration, and igniting said mixture when in said configuration to achieve total combustion of said primary fuel, and (3) mixing the hot gaseous products of said combustion process with a secondary fuel which is preferably gaseous, the reaction of said combustion products and said secondary fuel producing a gaseous mixture containing substantial amounts of CO and $H_2$.

The invention also provides an apparatus suitable for performing the process of the invention and comprising a combustion chamber, a burner in said chamber, first means for blending together an oxidising gas and a primary fuel to produce a compressible gas-like mixture, second means in said chamber for causing the mixture to assume a highly turbulent compact and self-contained configuration, and third means for introducing a secondary fuel into said chamber for mixing with the products of combustion of said mixture to produce a gaseous mixture containing substantial amounts of CO and $H_2$.

The process of this invention preferably takes advantage of the effect of swirl on a compressible combustible fluid entering a cylindrical combustion chamber. This effect has been described in detail by J. M. Beer and N. A. Chigier ('Combustion Aerodynamics', Applied Science Publishers Ltd., London, 1972). In swirling systems, an axial low pressure region develops. If the degree of swirl is sufficiently large, peripheral fluid will recirculate. The correct degree of swirl will give a torroidal vortex, which is highly turbulent, compact and self-contained. The combustion zone which results when this torroidal vortex is ignited is extremely stable and very well mixed.

The use of the correct degree of swirl in the process of the present invention results in the formation of a total combustion zone which is self-contained enough to maintain its identity without the necessity for a baffle to separate it from the secondary fuel. In the present case the correct degree of swirl is achieved when the swirl has a swirl number (as defined in Combustion Aerodynamics) greater than about 0.5 but not so high that a 'wall jet' (as defined in Combustion Aerodynamics) develops. It is unlikely that a wall jet would develop if the swirl number were kept below about 1.5. By contrast, distinct total combustion zones cannot be achieved in any of the processes specified in the Garrison patent without the assistance of baffles. The use of aerodynamic controls to develop and maintain the array of reaction zones in appropriate order is superior to any mechanical system such as the Garrison patent requires, and experience shows that no materials are available with which a total combustion zone can be confined by walls and operate stoichiometrically without major loss of heat by water cooling or early failure of the wall. Hence reaction vessels for the process of the present invention are inherently simpler in design.

The present invention differs from the Garrison patent in several other respects. These differences represent advantages in the application of our process.

a. The total combustion zone in our process is appreciably more compact for a given throughput of material. This high intensity operation ensures high temperatures and fast reactions. Moreover, this compactness enables a smaller plant, with associated economies of scale, to be constructed for a given output.

b. The highly turbulent, self-contained total combustion zone ensures that even fuels difficult to ignite and to combust are fully combusted so that unburnt fuel losses are not experienced, whereas the Garrison patent makes no provision to ensure this. In this way very difficult fuels such as water slurries of coal can be totally and stably combusted in a relatively small total combustion zone.

c. The better mixing of the hot total combustion zone product with a cooler secondary gaseous fuel results in soot free reactions. This mixing zone enables a close approach to thermodynamic equilibrium. By contrast, the baffles proposed in the Garrison patent inhibit the mixing and encourage the deposition of soot.

In order that the invention may be more readily understood, three examples thereof will be described with reference to the accompanying drawings in which.

Referring firstly to FIGS. 1 to 4, the combustion system comprises a combustion chamber 10, including a refractory lined tube 12, having a secondary gas inlet chamber 14, penetrated by a burner 16, and secured to one end of the tube 12, and a refractory lined exhaust stack 18 secured to the other end of the tube 12. The chamber 10 is about 2450 mm long and has an internal diameter of about 300 mm. The inlet chamber 14 has a tangential inlet pipe 20 through which the secondary fuel (towns gas) is introduced so that it circulates down the tube 12 adjacent to the wall thereof.

Figures 1, 4:
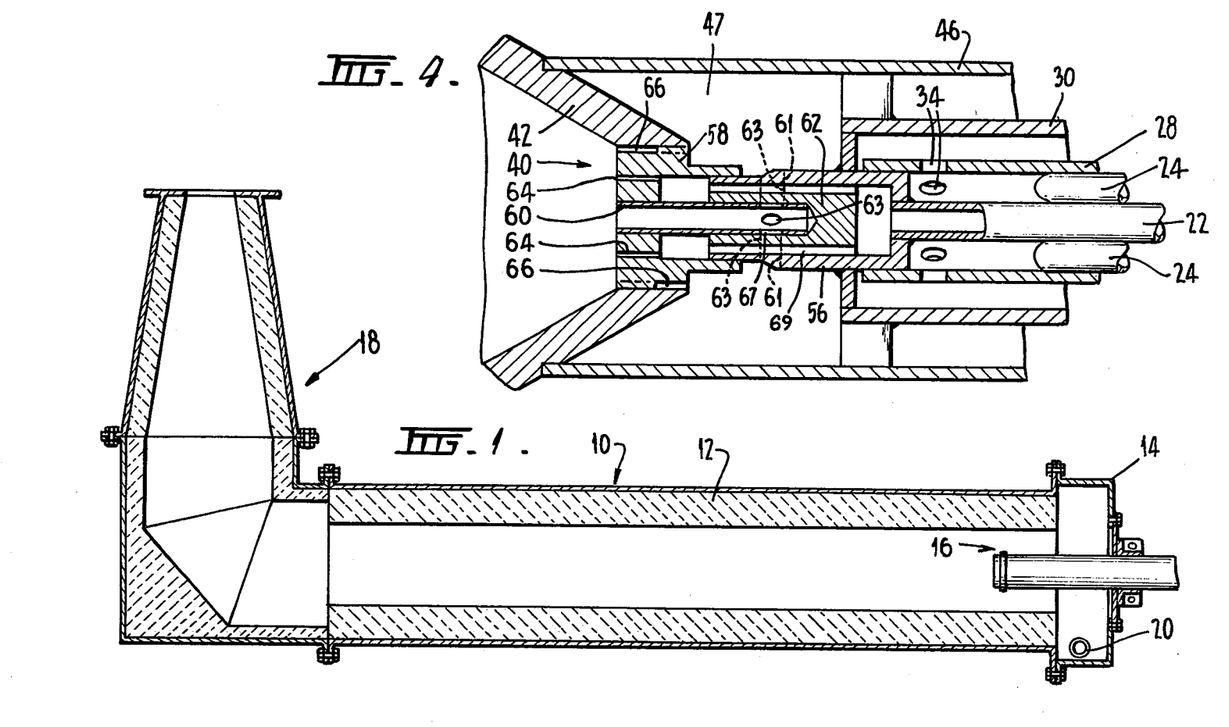
FIG. 1 is a longitudinal sectional elevation of a combustion system suitable for burning diesel oil as the primary fuel with towns gas as a secondary fuel.
FIGS. 3 and 4 are end and side elevations of the burner nozzle shown in FIG. 2A.
Figures 2A, 3:
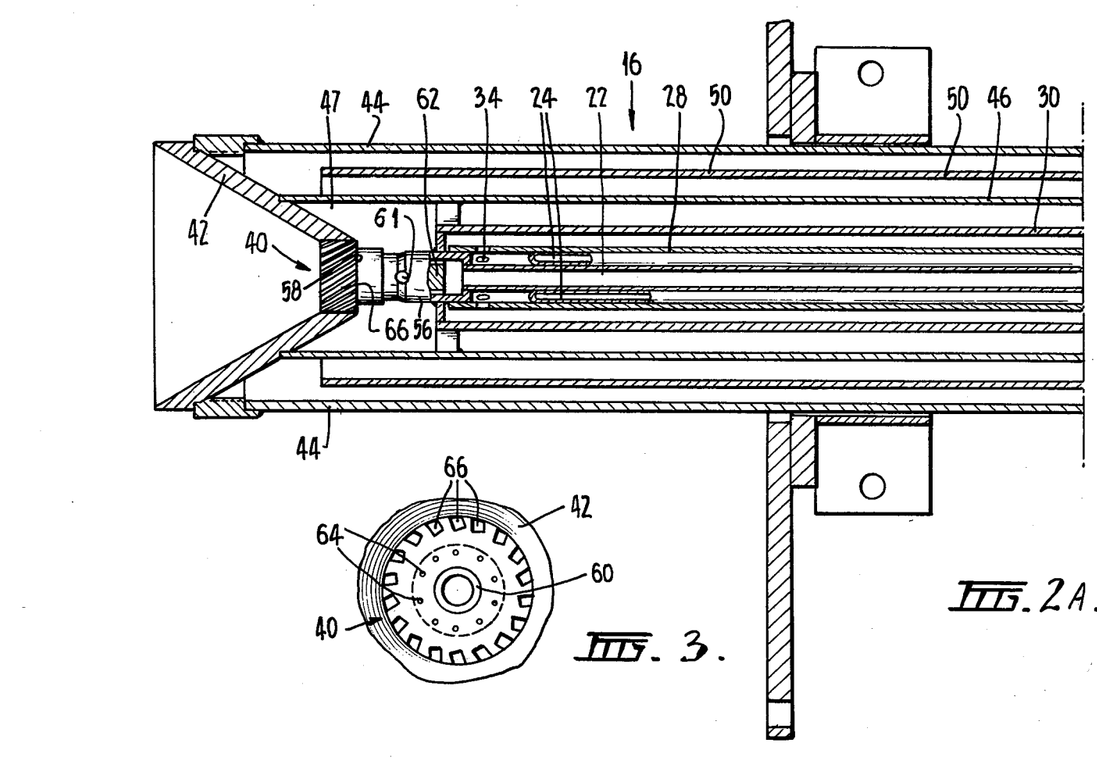
FIGS. 2A, 2B, and 2C show contiguous portions of an enlarged longitudinal sectional elevation of the burner used in the system of FIG. 1.
Figure 2B:
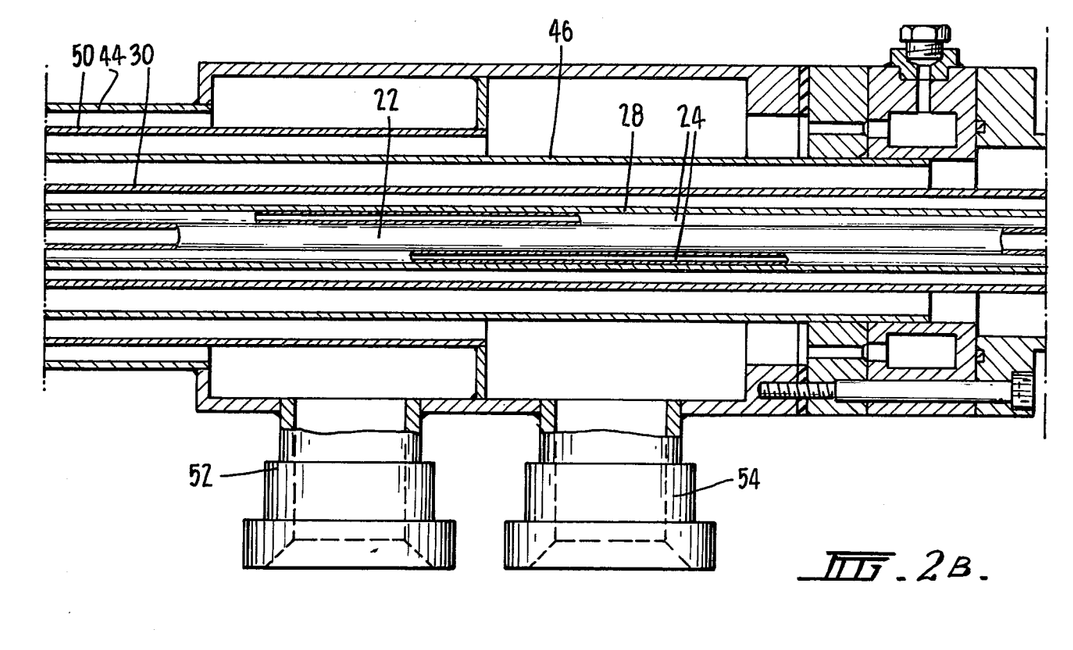
Figure 2C:
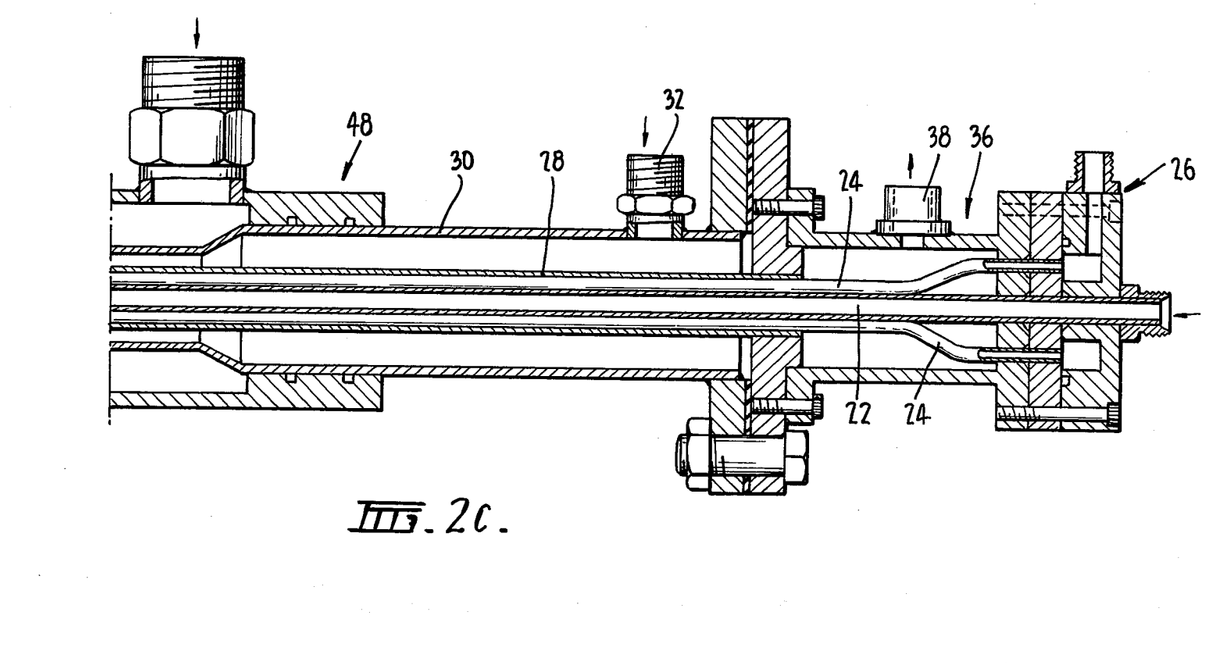

The burner 16 which is shown in detail in FIGS. 2A to 2C, comprises a central primary fuel (diesel oil) supply pipe 22, and two further supply pipes 24 connected to an inlet chamber 26. The supply pipes 24 and chamber 26 are not used in the present embodiment but adapt the burner for use in other modes, for example as in the embodiment of FIGS. 7 and 8. The pipes 24 are therefore closed at their free ends (FIGS. 2A and 4). The pipes 22 and 24 are contained within a tube 28 which is in turn contained within a tubular water jacket 30 having a water inlet fitting 32. The tube 28 is formed with holes 34 for the admission of water from the jacket 30 and the jacket opens into a chamber 36 having a water outlet fitting 38.

The central oil pipe 22 opens into a burner nozzle 40 which is surrounded by a divergent nozzle extension 42 to which the housing 44 of the burner is sealingly secured. A further tube 46 extends within the housing 44 from an oxygen inlet chamber 48, to the nozzle extension 42 where it is sealingly secured. This tube 46 defines a passageway which leads to a chamber 47 within which the nozzle 40 is partly located. Between the housing 44 and the tube 46 there is arranged a baffle 50 which controls the circulation of cooling water from the inlet fitting 52 to the outlet fitting 54 as shown.

Referring now to FIGS. 3 and 4, it will be seen that the burner nozzle 40 has a hollow body 56 and an annular head 58 fitted to the forward end of the body 56. The head 58 has a central oxygen tube 60 which extends from a holder 62 in the body 56. Oxygen is fed to the holder 62 through holes 61 in the body 56 communicating with radial bores 63 in the holder 62 and holes 67 in the tube 60. As shown, the central oil tube 22 opens into the hollow body 56 and the oil passes through passages 69 in the holder 62 to a chamber behind the head 58, and then through a series of axial holes 64 in the head 58 surrounding the oxygen tube 60. The burner head 58 is formed with eighteen slots 66 which extend at an angle of 30° to the axis of the head 58. These slots 66 conduct oxygen from the chamber 47 and impart a swirling motion to the oxygen/oil mixture.

The system described above has been tested using diesel oil as the primary fuel and towns gas as the secondary fuel. The diesel oil was supplied to the system at a rate of 57.6 kg/h (68.2 l/h), the oxygen at a rate of 194 kg/h (136 normal m³/h), and the towns gas at a rate of 202 kg/h (271 normal m³/h). Hence the ratio of the mass flow rate of secondary fuel to that of primary fuel was 3.5. The design of the burner nozzle 40 ensures that the diesel oil is dispersed through the oxygen, while imparting a swirling motion to the mixture, all in the context of a continuous combustion operation. The slots 66 are used to carry the bulk of the oxygen supply, and to provide it with both axial and tangential components of motion. A smaller fraction of the oxygen supply was admitted, with axial motion only, via the central tube 60. This central oxygen stream is not essential to the process but assists in breaking up the axial jets of oil. The towns gas was admitted to the reaction chamber tangentially, so as to make it circulate in the opposite sense to the swirl of the total combustion zone. When the system was operated, a self-contained, compact, and highly intense total combustion zone was observed to occur. The system was operated at near atmospheric pressure. Ignition was achieved by inserting a lighted oxygen/acetylene torch through a hole (not shown) in the inlet chamber 14.

Table 1 shows the composition of the towns gas and Table 2 shows the observed composition of the product gas from the system compared with the theoretical equilibrium composition computed at the sampling temperature of 1600° K. It is apparent that the conditions achieved in this system are not far removed from the ideal conditions of perfect mixing and chemical equilibrium.

The ratio of mass flow rates of the two fuels is not critical. Tests have shown that flow ratios between 3 and 5 produce satisfactory results. The higher ratios tend to give more CO, $H_2$ $CH_4$, and less $CO_2$ and $H_2O$. Hence, the product gas composition can be varied over a substantial range by adjustment of this ratio.

A modified combustion system designed for use with liquified petroleum gas (LPG) as the primary and secondary fuels is shown in FIGS. 5, 6, 6A, 6B and 6C. In this system the combustion chamber 70 is smaller (being 1260 mm long to the centreline of the exhaust stack and 100 mm internal diameter) but the construction is basically the same. The burner 72 (FIG. 6) is secured to the open end of the chamber 70 and a tangential LPG gas inlet opening 75 is arranged near the end of the burner assembly. An ignition hole (not shown) is provided in the chamber 70 at the same position as inlet 75 but angularly spaced therefrom.

Figures 5, 6:
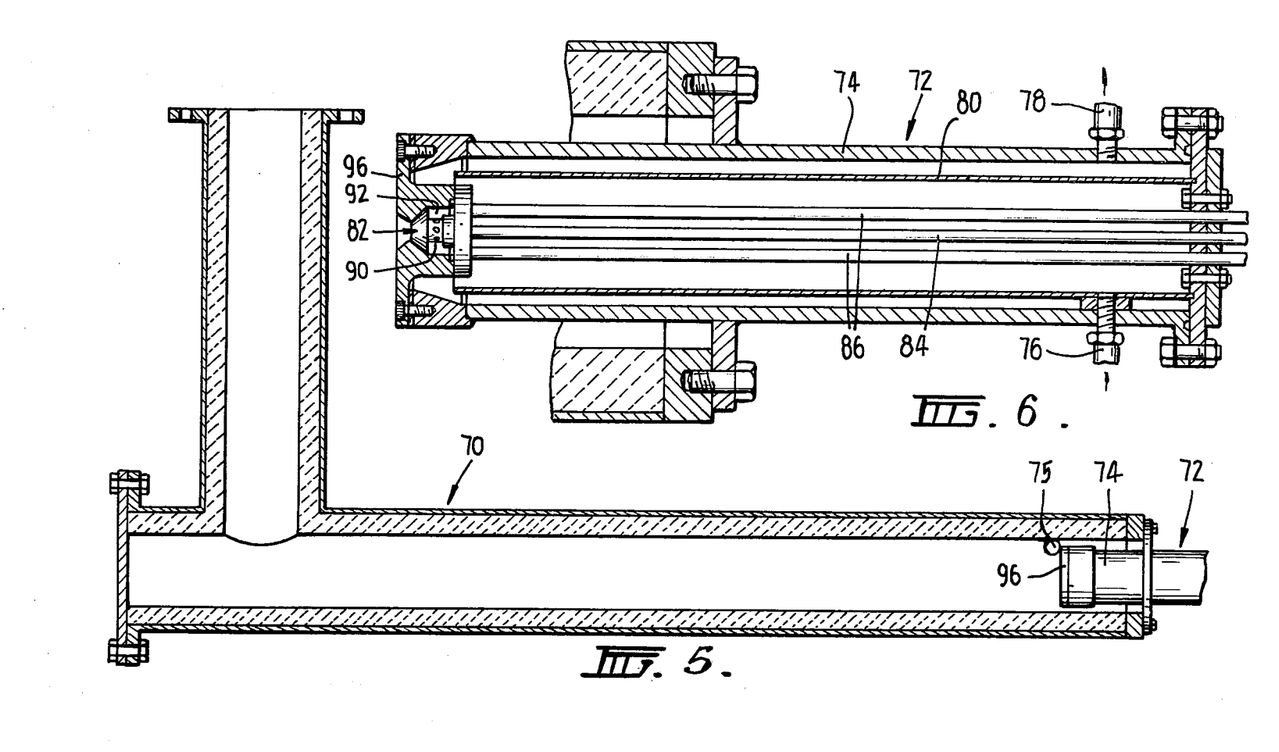
FIG. 5 is a sectional side elevation of a modified combustion system suitable for burning LPG as the primary and secondary fuels.
FIG. 6 is an enlarged longitudinal sectional elevation of the burner suitable for the system of FIG. 5.
Figure 6A:
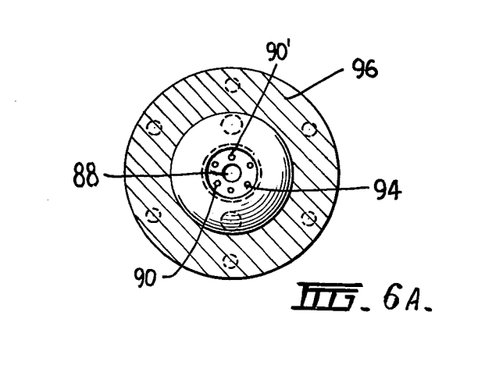
FIG. 6A is an enlarged view of the front of the burner nozzle shown in FIG. 6.
Figures 6B, 6C:
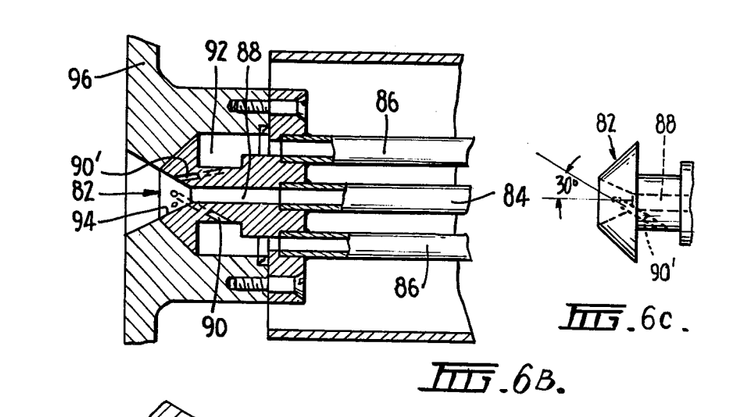
FIG. 6B is an enlarged fragmentary sectional side elevation of the nozzle.
FIG. 6C is an enlarged fragmentary plan view of the nozzle.

Referring to FIG. 6, the burner 72 will be seen to comprise a housing 74 having a water inlet 76 and a water outlet 78 and a tubular baffle 80 arranged to ensure adequate residence time of the water in the housing 74. The housing supports a burner nozzle 82 to which is connected an LPG gas inlet pipe 84 and two oxygen pipes 86. The nozzle 82 has a central passage 88 through which the gas from pipe 84 passes and a series of six circumferentially spaced bores 90 extending from behind the head of the nozzle, and opening to the chamber 92 fed with oxygen by pipes 86, to the flared face 94 of the nozzle at an angle of 30° to the axis of the nozzle. This angle is indicated in FIG. 6C which shows, for reasons of clarity, only the top bore 90' of the bores 90 in FIG. 6A. Each bore 90 also has an angle of tilt. For example see the top bore 90' in FIG. 6B. This angle is not essential to the process of this embodiment, but the component of motion imparted by this tilt assists in breaking up the primary fuel stream. The nozzle is held in position by a face plate 96 having a divergent opening therein which mates with the nozzle 82 to form a nozzle extension like extension 42 of the first embodiment.

The above system has been tested and as in the first embodiment, the angular placement of the bores 90 ensured that the correct degree of swirl was imparted to the primary LPG and oxygen mixture. In the tests the supply of oxygen was just sufficient to burn the primary LPG stoichiometrically to $CO_2$ and $H_2O$. The primary LPG was supplied to the system at a rate of 1.88 kg/h (0.948 normal m³/h), the oxygen at a rate of 6.94 kg/h (4.86 normal m³/h), and the secondary LPG at a rate of 3.66 kg/h (1.85 normal m³/h).

Table 3 shows the observed composition (dry basis) of the product gas from the system, compared with the theoretical equilibrium composition (dry basis) computed at the sampling temperature of 1100° K. As in the first embodiment, it is apparent that the conditions achieved in practice approach quite closely the ideal conditions of perfect mixing and chemical equilibrium. In this example, it was found that the product gas composition could be varied over a wide range by adjustment of the ratio of the mass flow rates of the primary and secondary fuels.

Figure 7:
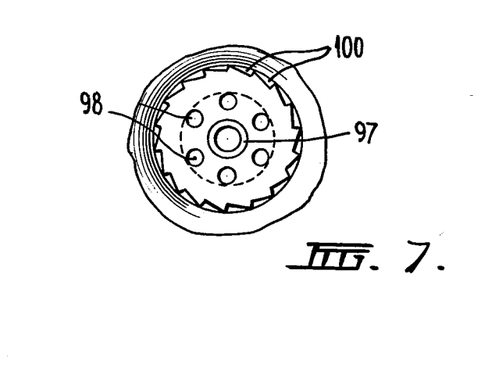
FIGS. 7 and 8 are end and side elevations of a modified burner nozzle suitable for use in the system of FIGS. 1 and 2 for burning a coal slurry as the primary fuel and towns gas as the secondary fuel.
Figure 8:
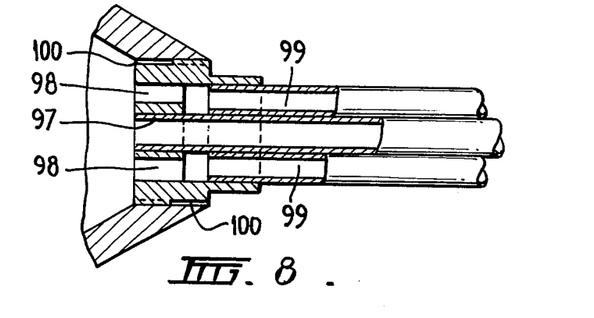

In the third form of the invention, the combustion system is identical with that shown in FIGS. 1 and 2 with the exceptions that the burner nozzle is as shown in FIGS. 7 and 8, the central pipe 97 corresponding to pipe 22 conducts a water/coal slurry to the centre of the nozzle and the pipes 99 corresponding to pipes 24 feed LPG to the six holes 98 surrounding the tube 97. The nozzle has a series of slots 100 extending at 47° to the nozzle axis and these conduct oxygen with the correct degree of swirl to the slurry/LPG mixture.

This embodiment was tested using a slurry consisting of 55% coal and 45% water, together with a small quantity of LPG. The coal was pulverised to a size such that 80% of a representative sample passed through a 75 micrometer British Standard test sieve. The oxidising gas was oxygen, and the secondary fuel was a towns gas with the composition shown in Table 1. The supply of oxygen was just sufficient to burn the coal slurry and the LPG stoichiometrically to $CO_2$ and $H_2O$. The coal slurry was supplied to the system at a rate of 158 kg/h (132 l/h), the LPG at a rate of 40.2 kg/h (20.3 normal m³/h), the oxygen at a rate of 391 kg/h (274 normal m³/h), and the towns gas at a rate of 491 kg/h (659 normal m³/h). When the system was operated, ignition being achieved as in the above embodiments, a self-contained, compact, and highly intense total combustion zone was observed to occur. Except for ash arising from the mineral matter in the coal, virtually no solid or liquid residues remained in the reaction chamber after operation of the system.

Table 4 shows the observed composition (dry basis) of the product gas from the system, compared with the theoretical equilibrium composition (wet basis) computed at the sampling temperature of 1300° K. As in the first embodiment it is apparent that the conditions achieved in this system are not far removed from the ideal conditions of perfect mixing and chemical equilibrium.

While in each of the above embodiments the self-contained, compact, highly intense combustion zone was achieved by the use of the correct degree of swirl, it is believed that other methods may be used to achieve similar results. For example, burners employing the Coanda effect, (see proceedings of 15th Symposium on Combustion 1974, The Combustion Institute) and burners with bluff bodies in the combustion stream (see Combustion Aerodynamics) may achieve similar results. Similarly while in each of the above embodiments the process is conducted under atmospheric pressure conditions it is envisaged that the process would be particularly advantageous if conducted at high pressures to faciliate the use of the product gas in high pressure synthesis processes. Furthermore, it is not essential for the secondary fuel to circulate down the chamber in the manner described above. For example, instead of circulating the fuel in the opposite direction to the swirl it may be circulated in the same direction. Alternatively, the secondary fuel may be introduced axially in a circumferential array of closely spaced jets adjacent to the wall of the combustion chamber so that the jets combine substantially to form a sheath around the total combustion zone.

TABLE 1

TOWNS GAS COMPOSITION

| Gaseous Component | Mole Fraction | Mass Fraction |
|---|---|---|
| $CO_2$ | 0.193 | 0.506 |
| $H_2O$ | 0.010 | 0.011 |
| CO | 0.035 | 0.058 |
| $H_2$ | 0.689 | 0.083 |
| $CH_4$ | 0.002 | 0.002 |
| $C_4H_{10}$* | 0.001 | 0.003 |
| $C_5H_{12}$* | 0.040 | 0.175 |
| $C_6H_{14}$* | 0.026 | 0.137 |
| cyclohexane | 0.002 | 0.015 |
| methyl cyclohexane | 0.002 | 0.010 |
| Total | 1.000 | 1.000 |

*includes all isomers

TABLE 2

COMPOSITION OF PRODUCT GAS (FIRST EMBODIMENT)

| Gaseous Component | Observed Mole Fraction | Theoretical Equilibrium Mole Fraction |
|---|---|---|
| $CO_2$ | 0.038 | 0.039 |
| $H_2O$ | 0.150 | 0.151 |
| CO | 0.382 | 0.356 |
| $H_2$ | 0.415 | 0.454 |
| $CH_4$ | 0.015 | 0.000 |
| Total | 1.000 | 1.000 |

TABLE 3

COMPOSITION OF PRODUCT GAS (DRY BASIS) (SECOND EMBODIMENT)

| Gaseous Component | Observed Mole Fraction | Theoretical Equilibrium Mole Fraction |
|---|---|---|
| $CO_2$ | 0.049 | 0.028 |
| CO | 0.396 | 0.423 |
| $H_2$ | 0.515 | 0.549 |
| $CH_4$ | 0.028 | 0.000 |
| Other* | 0.012 | 0.000 |
| Total | 1.000 | 1.000 |

*higher hydrocarbons plus air leakage into gas samples as determined by direct analysis. The $H_2O$ content of the product was not determined. Its theoretical mole fraction (dry basis) is 0.037.

TABLE 4

COMPOSITION OF PRODUCT GAS (THIRD EMBODIMENT)

| Gaseous Component | Observed Mole Fraction | Theoretical Equilibrium Mole Fraction |
|---|---|---|
| $CO_2$ | 0.078 | 0.058 |
| $H_2O$ | 0.147 | 0.151 |
| CO | 0.280 | 0.318 |
| $H_2$ | 0.467 | 0.473 |
| $CH_4$ | 0.0270 | 0.000 |
| $O_2$ | 0.000 | 0.000 |
| Other* | 0.001 | 0.000 |
| Total | 1.000 | 1.000 |

*higher hydrocarbons as determined by direct analysis.

We claim:

1. A process for the production of a gaseous mixture containing substantial amounts of carbon monoxide and hydrogen, comprising the steps of:
   1. blending an oxidizing gas and a primary fuel within a combustion chamber having a combustion zone, said combustion chamber being substantially free of baffles in said combustion zone, to produce a compressible gas or gas-like mixture, 2. causing said mixture to assume a highly turbulent compact and self-contained configuration, provided that, however, when said self-contained configuration is achieved by causing the mixture to swirl, then the swirl number is greater than 0.5 and no greater than about 1.5, and igniting said mixture when in said configuration to achieve total combustion of said primary fuel to produce hot gaseous products, and 3. thereafter mixing and reacting the hot gaseous products of said combustion process with a gas-like secondary fuel in said combustion chamber, wherein the secondary fuel is introduced into said combustion chamber adjacent to the wall thereof and in physical contact with said self-contained configuration, to produce a gaeous mixture containing substantial amounts of CO and $H_2$.

2. Process of claim 1, wherein steps 1 and 2 are conducted in a cylindrical combustion chamber and are achieved by causing said mixture to swirl, the swirl number of said mixture being not so great as to cause a wall jet to develop at the wall of the chamber.

3. Process of claim 1, wherein the secondary fuel forms a sheath around said combustion zone, which sheath is in direct physical contact with the products of the combustion process.

4. The process of claim 1, wherein said primary fuel is oil which is introduced into the combustion chamber in small axial jets, said oxidising gas being introduced with both axial and tangential components of motion to cause the oil to be atomised and the resultant mixture to swirl, said secondary fuel being gaseous and being introduced to the chamber adjacent to the wall thereof so that it forms a sheath around the total combustion zone, which sheath is in direct physical contact with the products of said combustion process.

5. The process of claim 4, wherein a major proportion of said oxidising gas is introduced into said chamber in a plurality of circumferentially spaced jets each at an angle of about 30° to the axis of the chamber, a minor proportion of said oxidising gas being introduced axially of the chamber.

6. The process of claim 1, wherein the primary and secondary fuels are gaseous, said primary fuel being introduced axially of said chamber, said oxidising gas is introduced with both axial and tangential components to cause the gaseous mixture to swirl and in quantities sufficient to cause stoichiometric burning of said primary fuel to $CO_2$ and $H_2O$, said secondary fuel being gaseous and being introduced to the chamber adjacent to the wall thereof so that it forms a sheath around the total combustion zone, which sheath is in direct physical contact with the products of said combustion process.

7. The process of claim 6, wherein a major proportion of said oxidising gas is introduced into said chamber in a plurality of circumferentially spaced jets each at an angle of about 30° to the axis of the chamber, a minor proportion of said oxidising gas being introduced axially of the chamber.

8. The process of claim 1, wherein said primary fuel comprises a mixture of particulate solid fuel in a liquid carrier forming a slurry and a gaseous fuel, said primary fuel being introduced axially of said chamber, said oxidising gas being introduced with both axial and tangential components to cause the gas-like mixture of said primary fuel and oxidising gas to swirl and in quantities sufficient to cause stoichiometric burning of said solid and gaseous fuels to $CO_2$ and $H_2O$, said secondary fuel being gaseous and being introduced to the chamber adjacent to the wall thereof so that it forms a sheath around the total combustion zone which sheath is in direct physical contact with the products of said combustion process.

9. The process of claim 8, wherein said mixture comprises 55% particulate coal and 45% water together with a small quantity of gaseous fuel.

* * * * *